United States Patent [19]

Serizawa et al.

[11] Patent Number: 4,598,788
[45] Date of Patent: Jul. 8, 1986

[54] STEERING SYSTEM FOR VEHICLES

[75] Inventors: Mitsuya Serizawa, Tochigi; Shoichi Sano, Tokyo; Yoshimi Furukawa, Tochigi, all of Japan

[73] Assignee: Honda Giken Kogyo Kabushiki Kaisha, Tokyo, Japan

[21] Appl. No.: 695,956

[22] Filed: Jan. 29, 1985

[30] Foreign Application Priority Data

Feb. 2, 1984 [JP] Japan ................................. 59-18135
Feb. 2, 1984 [JP] Japan ................................. 59-18136

[51] Int. Cl.⁴ .......................................... B62D 5/00
[52] U.S. Cl. ................................... 180/140; 180/141
[58] Field of Search ............... 180/140, 141, 142, 143; 280/91

[56] References Cited

U.S. PATENT DOCUMENTS 4,418,780 12/1983 Ito et al. ........................ 180/142

FOREIGN PATENT DOCUMENTS 2401950 7/1974 Fed. Rep. of Germany ...... 180/141
53-140605 12/1978 Japan ................................ 180/141

Primary Examiner—John A. Pekar
Attorney, Agent, or Firm—Irving M. Weiner; Joseph P. Carrier; John J. Cantarella

[57] ABSTRACT

A steering system for a vehicle with front and rear wheels suspended from a vehicle body through a suspending mechanism, comprising a front wheel steering mechanism for steering the front wheels at an angle in accordance with a steering operation of a driver, and a rear wheel steering mechanism for steering the rear wheels at an angle in accordance with a travelling state of the vehicle. The rear wheel steering mechanism has an arrangement for determining a steered angle correction quantity of the rear wheels in correspondence with a cushioning state of the wheel suspending mechanism, and an arrangement for specifying the steering angle of the rear wheels in accordance with the steered angle correction quantity.

The cushioning state may be ascertained by detecting a cushioning stroke of the suspending mechanism or a roll angle of the vehicle.

10 Claims, 8 Drawing Figures

4,598,788

STEERING SYSTEM FOR VEHICLES

BACKGROUND OF THE INVENTION

1. Field of the Invention

The present invention relates generally to a steering system for vehicles. More particularly, the invention relates to a steering system for a vehicle with front and rear wheels, of the type which includes a front wheel steering mechanism for steering the front wheel in accordance with a steering operation of a driver and a rear wheel steering mechanism for steering the rear wheel in accordance with a travelling state of the vehicle.

2. Description of Relevant Art

There have been proposed various steering systems for vehicles with front and rear wheels, such as four-wheeled motor vehicles; an exemplary steering system of such type being disclosed in U.S. Pat. No. 4,412,594. Each such steering system includes a front wheel steering mechanism for steering the front wheels at an angle in accordance with a steering operation of a driver of the vehicle and a rear wheel steering mechanism for steering the rear wheels at an angle in accordance with a travelling state of the vehicle.

By virtue of such a steering system, both the turning characteristics and the steering responsiveness of vehicles can be greatly improved.

Generally, in vehicles of a type having road wheels suspended from a vehicle body through suspensions, respectively, there has been a problem in that, while performing cushioning actions, the suspensions produce steering variations of the wheels, such as a bump steering effect and a rebound steering effect, for example. Such variations result from geometrical characteristics, depending on the construction of the suspensions and corresponding to the cushioning actions, and act as a disturbance to the steering performance of such vehicles.

Particularly, in a popular four-wheeled automobile having a vehicle body with an engine mounted on the front part thereof and thus being lighter in weight at the rear part than at the front part thereof, such variations tend to develop more seriously on the rear wheels than on the front wheels. Thus, when travelling on an expressway with a damaged road surface, for example, the vehicle may suffer from steering variations at the rear wheel side, corresponding to cushioning actions of rear suspensions due to undulations of the road surface, to the point of causing a fish-tailing motion.

In this respect, in a vehicle including a front wheel steering mechanism for steering front wheels at an angle according to a steering operation of a driver, although steering variations developing on the front wheels may be absorbed by the steering operation, it is not easy to compensate for those on the rear wheel side.

Moreover, in a vehicle of the type which has road wheels suspended from a vehicle body through suspensions, there has been another problem in that, when the vehicle is turning, the vehicle body rolls, producing a difference of cushioning action between left and right suspensions corresponding to the roll angle. Corresponding steering or camber variations are thus caused to develop on those wheels suspended by the left and right suspensions, which unfavorably affects steering of such vehicle.

Further, such a rolling motion produces, between tires of the left and right wheels, a difference of the contact load to the ground in accordance with the roll angle, while causing the lateral force characteristic to be different between tires of the front and rear wheels, so that the steering responsiveness changes as a steering wheel is turned.

In this respect, in a vehicle with a front wheel steering mechanism for steering front wheels at an angle according to a steering operation, a driver is expected to cope with such steering variations, as well as the difference in steering responsiveness, through a steering correction by the steering operation to the front wheels. However, considerable steering skill is required to smoothly perform such an operation.

The present invention effectively solves the foregoing conventional problems of a vehicle of the type including a steering system as described hereinabove.

SUMMARY OF THE INVENTION

The present invention provides a steering system for a vehicle having a vehicle body with front and rear wheels, and front suspensions and rear suspensions for suspending the front wheels and the rear wheels from the vehicle body, respectively. The steering system includes a front wheel steering mechanism for steering the front wheels at an angle in accordance with a steering operation of a driver, and a rear wheel steering mechanism for steering the rear wheels at an angle in accordance with a travelling state of the vehicle, with the steering being desirably free from disturbances due to cushioning actions of the suspensions.

An object of the present invention is to provide a steering system wherein steering variations due to the cushioning actions of the suspensions are effectively accommodated without relying on a corrective steering operation of the driver. The stability and driving comfort during travel of the vehicle are thus both enhanced, particularly in the straight-travelling mode of operation.

Another object of the present invention is to adapt the foregoing steering system so as to accommodate or compensate for steering variations as well as changes in the steering responsiveness due to rolling motions of the vehicle, without relying on any corrective steering operation by the driver, thus achieving a remarkable contribution to the travelling stability and the driving comfort of the vehicle, particularly during turning operations.

According to the present invention, there is provided a steering system for a vehicle including a vehicle body with a front wheel and a rear wheel and a wheel suspending mechanism for suspending the front wheel and the rear wheel from the vehicle body, comprising a front wheel steering mechanism for steering the front wheel at an angle in accordance with a steering operation of a driver of the vehicle and a rear wheel steering mechanism for steering the rear wheel at an angle in accordance with a travelling state of the vehicle. The rear wheel steering mechanism has a first means for determining a steered angle correction quantity of the rear wheel in correspondence with a cushioning state of the wheel suspending mechanism and a second means for specifying the steering angle of the rear wheel in accordance with the steered angle correction quantity.

In such steering system, the first means may comprise a detecting means for detecting a cushioning stroke of the wheel suspending mechanism and a processing means for determining the steered angle correction quantity in correspondence with the cushioning stroke.

Alternatively, the first means may comprise a detecting means for detecting a roll angle of the vehicle and a processing means for determining the steered angle correction quantity corresponding to the roll angle.

The above and further objects, details and advantages of the present invention will become more apparent from the following detailed description of preferred embodiments of the invention when read in conjunction with the accompanying drawings.

DETAILED DESCRIPTION OF PREFERRED EMBODIMENTS

Figure 1:
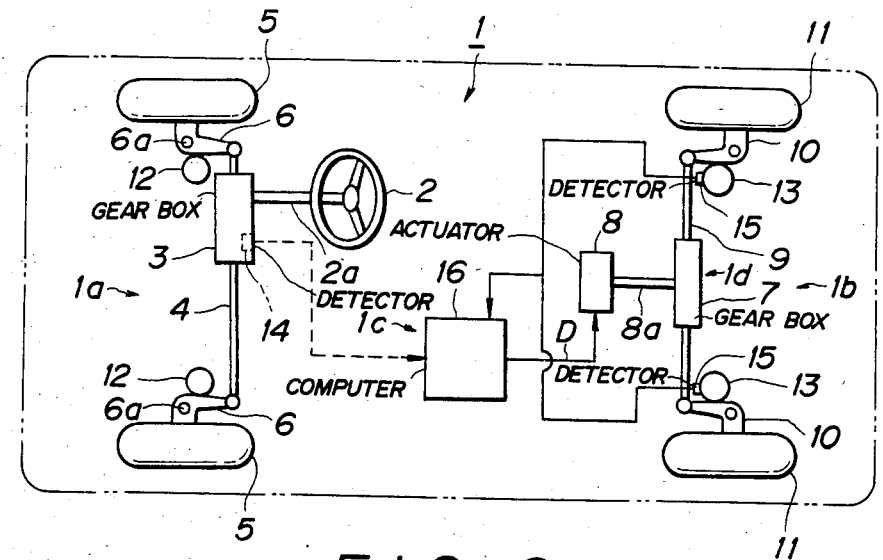
FIG. 1 is a plan view schematically showing the constitution of a vehicle equipped with a steering system according to a first embodiment of the invention.

There will be described hereinbelow two embodiments of the invention, with reference to the accompanying drawings, wherein like parts are designated by like reference characters.

The first embodiment of the invention is shown in FIGS. 1 to 4.

With reference to FIG. 1, designated at reference numeral 1 is the entirety of a steering system equipped in a vehicle as shown by dashed line. The steering system 1 comprises a front wheel steering mechanism 1a for steering left and right front wheels 5, 5 at an angle Sf in accordance with a steering operation that a driver (not shown) of the vehicle makes through a steering wheel 2, from the neutral position of FIG. 1 corresponding to a straight-travelling state of the vehicle. Also provided is a rear wheel steering mechanism 1b for steering left and right rear wheels 11, 11 at an angle Sr in accordance with a travelling state of the vehicle, from the neutral position of FIG. 1 corresponding to the straight-travelling state.

The steering wheel 2 for the steering operation of the driver has an angular displacement corresponding to the amount of the operation, which angular displacement is transmitted through a steering shaft 2a to a gear (not shown) such as of a rack and pinion type in a gear box 3, where it is converted into a transverse displacement of a front tie rod 4. The tie rod 4 has at the left and right ends thereof left and right front knuckle arms 6, 6 pivotably connected thereto at inner ends thereof, which arms 6, 6 are pivotable about a pair of pivot points 6a, 6a thereof, respectively. The left and right front wheels 5, 5 supported by corresponding outer ends of the knuckle arms 6, 6 are therefore steerable at an angle according to the transverse displacement of the tie rod 4, in the steering direction of the steering wheel 2.

On the other hand, the rear wheel steering mechanism 1b includes a control part 1c for determining the steering angle Sr of the rear wheels 11, 11 in accordance with the travelling state of the vehicle, the control part 1c outputting a control signal D, and an actuating part 1d for actuating to steer the rear wheels 11, 11 at the angle Sr, following the control signal D. More particularly, in accordance with the signal D, a servo-actuator 8 makes an angular displacement, which is transmitted through a shaft 8a to a gear (not shown) such as of a rack and pinion type in a gear box 7, where it is converted into a transverse displacement of a rear tie rod 9, whereby, through left and right rear knuckle arms 10, 10, the rear wheels 11, 11 are caused to be steered in a manner similar to that in the front wheel steering mechanism 1a.

The vehicle has a body (not shown), from which the left and right front wheels 5, 5 and the left and right rear wheels 11, 11 are dirigibly suspended through left and right front suspensions 12, 12 and left and right rear suspensions 13, 13, respectively.

The foregoing constitution is known in the art.

In the foregoing arrangement, the control part 1c of the rear wheel steering mechanism 1b is constituted by a detection system comprising a turning state detector 14 for detecting a turning state of the vehicle, left and right cushioning state detectors 15, 15 for detecting a cushioning state of the left and right rear suspensions 13, 13, respectively, and a microcomputer 16 for processing output signals of the detection system to specify the rear wheel steering angle Sr to be output as the control signal D to the actuator 8.

In this embodiment, the turning state detector 14 comprises a sensor (not shown) for detecting the front wheel steering angle Sf as a parameter to arrive at a value Tr representing the turning state. In this respect, such parameter is not limited to the front wheel steering angle Sf, and there may be voluntarily selected one of various applicable parameters such as a transverse acceleration and a yawing rate of the vehicle, which may be detected with a suitable sensor.

Moreover, each of the cushioning state detectors 15, 15 comprises a sensor (not shown) for sensing a cushioning stroke Cs of the corresponding rear suspension 13 as a parameter to arrive at a value Cr representing the cushioning state. As such sensor, there may be selected any suitable one such as a potentiometer type sensor adapted for electrically detecting with a sliding resistor or the like an expansion length of a damper of the corresponding suspension 13, a gap sensor for electrically or optically detecting a gap between a reference point on the vehicle body side and another reference point on the wheel side, or a sensor for detecting a resiliency factor or relative inclination of a damper.

Figure 2:
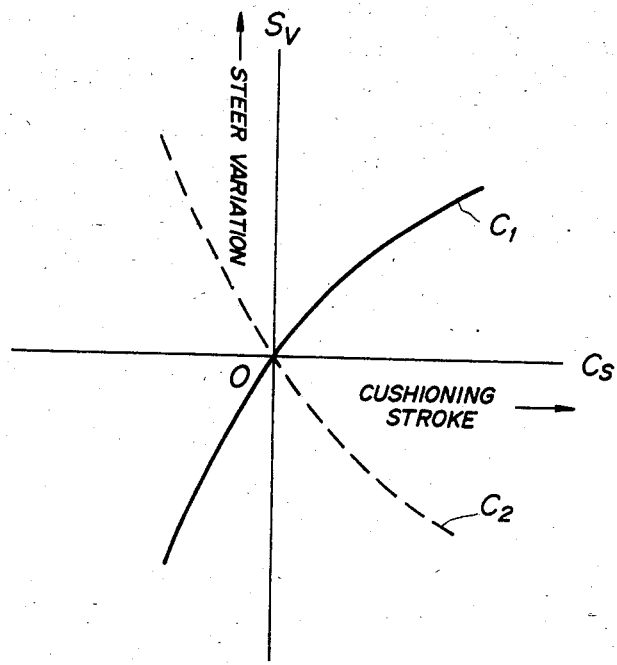
FIG. 2 is a graph of a characteristic curve showing the relation between a cushioning stroke of a suspension and a steering variation on a rear wheel of the vehicle of FIG. 1.

Referring now to FIG. 2, each of the left and right rear suspensions 13, 13 has a design reference state thereof predetermined to be identifiable with the corresponding rear wheel 11 as put in the neutral position, to which reference state the cushioning stroke Cs is detected to be relative. When the stroke Cs changes, there is developed on the rear wheel 11 a steering variation uniquely given by a constitutional characteristic in terms of the mechanical relation among the vehicle body, the suspension 13, and the rear wheel 11. As the stroke Cs becomes larger, the steering variation Sv is increased, as shown by a characteristic curve $C_1$ plotting the relation between the variation Sv and the stroke Cs. Although similar steering variations are also developed on the front wheels 5, 5, they are easily compensated for by a corrective steering operation of the driver. The steering variation Sv on each of the rear wheels 11, 11 can also be compensated for by corrective steering operation of the driver, however, such operation requires considerable skill on the part of the driver when the steering operation is required to be smooth. In this respect, it is preferable to make the position or steered angle of each rear wheel 11 corrected in accordance with a curve $C_2$ having a mirror-image relation with the characteristic curve $C_1$, with respect to an axis of abscissa $Sv=0$ of FIG. 2.

Figure 3:
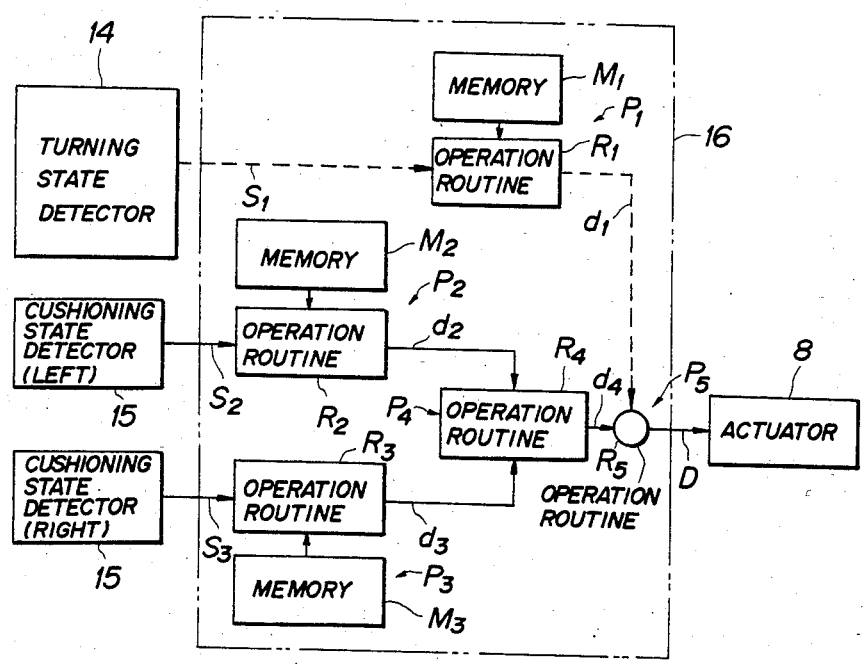
FIG. 3 is a functional block diagram of a control part of the steering system of FIG. 1.

Referring now to FIG. 3, to the computer 16 is connected the turning state detector 14 comprising the front wheel steering angle sensor, the detection result of which is passed as a detection signal $s_1$ to a first process function $P_1$ of the computer 16, where it is processed on the basis of data stored in a memory $M_1$, following an operation routine $R_1$, to obtain a data signal $d_1$ representing a common steering angle Sc of the rear wheels 11 corresponding to the aforesaid detection result.

Moreover, to the computer 16 are connected the respective cushioning state detectors 15, 15 of the suspensions 13, 13 of the left and right rear wheels, the detectors 15, 15 having detection signals $s_2$, $s_3$ thereof corresponding to detected cushioning strokes Cs of the corresponding rear suspensions 13, 13. The signals $s_2$, $s_3$, are passed to second and third process functions $P_2$, $P_3$ of the computer 16, respectively, where they are processed on the basis of data stored in memories $M_2$, $M_3$, following operation routines $R_2$, $R_3$, to obtain data signals $d_2$, $d_3$ representing both magnitude and direction of respective steering variations Sc corresponding to the aforesaid cushioning strokes Cs, respectively.

As will be understood from the cushioning stroke Cs versus steering variation Sv characteristic curve $C_1$, the steering variation Sv depends, in relation to the cushioning stroke Cs, on a certain function uniquely given such as by various dimensions of a suspension linkage (not shown). Accordingly, the operation routines $R_2$, $R_3$ may preferably have such a function programmed therein to thereby permit the data signals $d_2$, $d_3$ to be easily obtained without using the memories $M_2$, $M_3$.

The data signals $d_2$, $d_3$ are passed to a fourth process function $P_4$ of the computer 16, where they are processed, following an operation routine $R_4$, to obtain a data signal $d_4$ representing a steered angle correction angle Ac of the rear wheels 11, 11 determined so as to cancel the steering variation Sv.

In the fourth process function $P_4$, there may be employed an additional matrix-like memory having stored therein a set of actual steering variations each respectively corresponding to a pair of various detected steering variations Sv of the left and right rear wheels 11, 11, so that one of the actual steering variations may be identified by designating both the column and line thereof with the data signals $d_2$, $d_3$. There is thereby obtained a data signal representing a corrective steering angle specified for the magnitude and direction thereof to cancel the actual steering variation.

As will be easily understood, the process function $P_4$ has a role of providing a signal for the rear wheels 11, 11, in order to cancel the steering variation Sv according to the characteristic curve $C_1$ of FIG. 2, with a characteristic according to the curve $C_2$ contrary thereto.

Then, in a fifth process function $P_5$ of the computer 16, the data signal $d_4$ is subjected to an additive process with the data signal $d_1$ to specify, following an operation routine $R_5$, the rear wheel steering angle Sr, such that $Sr = Sc + Ac$ when the signal $d_1$ is given or, simply, $Sr = Ac$ when the signal $d_1$ is not given, which angle Sr is represented by the control signal D to be fed to the actuator 8. As a result, the actuator 8 steers the rear wheels 11, 11 at the angle Sr, thereby cancelling the undesired steering variation Sv due to the cushioning stroke Cs of each suspension 13.

In the foregoing arrangement, the turning state detector 14 and the first process function $P_1$ of the computer 16 may be eliminated to simplify the control part 1c of the steering system 1.

On the contrary, in order to improve the maneuverability of the vehicle, the left and right front suspensions 12, 12 may also be each respectively provided with one of a pair of cushioning state detectors having their detection signals passed to a pair of process functions additionally provided in the computer 16, respectively, which functions are similar either to the second process function $P_2$ and the other to the third process function $P_3$. In such case, the additional process functions may also have data signals thereof processed through the fourth process function $P_4$.

Figure 4:
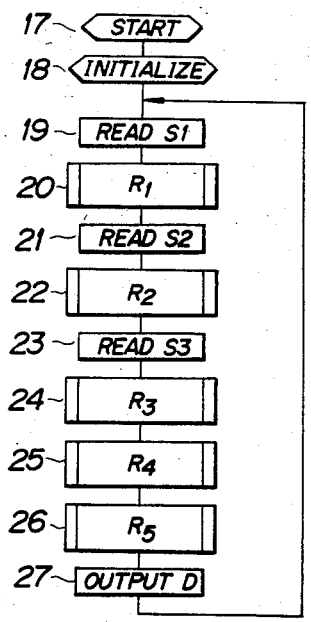
FIG. 4 is a schematic flow chart of a program for a microcomputer of the control part of FIG. 3.

Referring now to FIG. 4, there will be described below a program of the computer 16. The program is designed to start functioning when a power switch (not shown) or the like is turned on at a stage 17, and effects the initialization of peripheral devices (not shown) at a stage 18, before the program flow enters a main loop including a plurality of stages 19 to 27.

In the main loop, the detection signal $s_1$ of the turning state detector 14 is read at the first stage 19 and, at a subsequent state 20, the common steering angle Sc is obtained from the signal $s_1$, following the operation routine $R_1$. Next, at a stage 21, the detection signal $s_2$ from the cushioning state detector 15 of the left rear suspension 13 is read to determine therefrom, at a subsequent state 22, the steering variation Sv on the left rear wheel 11 following the operation routine $R_2$. Likewise, at a stage 23, the detection signal $s_3$ from the cushioning state detector 15 of the right rear suspension 13 is read to determine therefrom, at a subsequent state 24, the steering variation Sv on the right rear wheel 11, following the operation routine $R_3$. Then, the program flow enters a stage 25, where the correction angle Ac of the rear wheels 11, 11 is determined, following the operation routine $R_4$, and at a subsequent state 26, the common steering angle Sc is corrected by the correction angle Ac to specify the rear wheel steering angle Sr, following the operation routine $R_5$. After having output the control signal D to the actuator 8 at the last stage 27 of the main loop, the flow goes to the stage 19.

As will be understood from the foregoing description, according to the first embodiment of the invention the steering variation Sv as a disturbing factor to the steering of the vehicle due to the cushioning action of the suspensions 13, 13 is determined in correspondence with the cushioning stroke Cs, and the steered angle of the rear wheels 11, 11 are automatically controlled with the correction angle Ac as a steered angle correction quantity to cancel the steering variation Sv, so that the vehicle has an improved straight-travelling mode thereof.

Description will now be made of a second embodiment of the invention shown in FIGS. 5 to 8.

Figure 5:
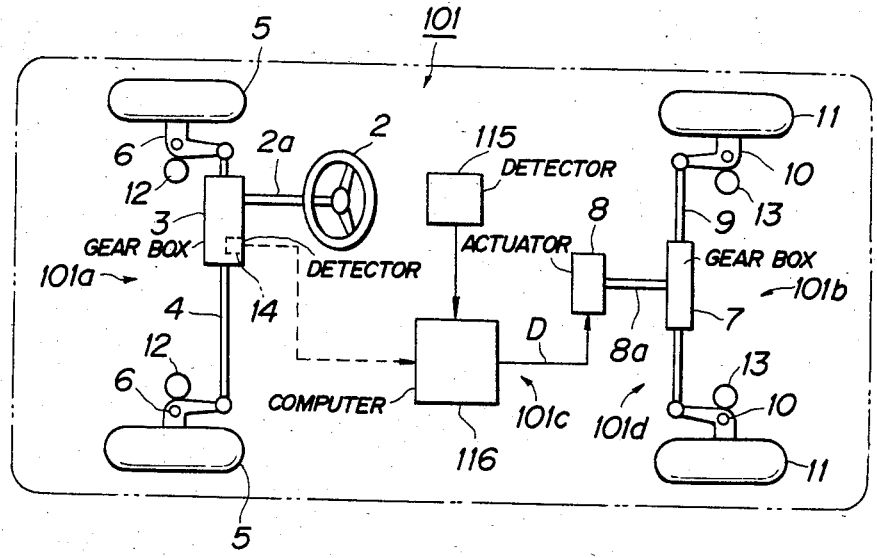
FIG. 5 is a plan view schematically showing the constitution of a vehicle equipped with a steering system according to a second embodiment of the invention.

In FIG. 5, designated at reference numeral 101 is the entirety of a steering system equipped in a vehicle shown by dashed line. The steering system 101 comprises a front wheel steering mechanism 101a for steering left and right front wheels 5, 5 at an angle Sf in accordance with a steering operation that a driver (not shown) of the vehicle makes through a steering wheel 2, from the neutral position of FIG. 5 corresponding to a straight-travelling state of the vehicle. Also provided is a rear wheel steering mechanism 101b for steering left and right rear wheels 11, 11 at an angle Sr in accordance with a travelling state of the vehicle, from the neutral position of FIG. 5 corresponding to the straight-travelling state.

The rear wheel steering mechanism 101b includes a control part 101c for determining the steering angle Sr of the rear wheels 11, 11 in accordance with the travelling state of the vehicle, the control part 101c outputting a control signal D, and an actuating part 101d for actuating to steer the rear wheels 11, 11 at the angle Sr, following the control signal D.

In the foregoing arrangement, the control part 101c of the rear wheel steering mechanism 101b is constituted by a detection system comprising a turning state detector 14 for detecting the steering angle Sf of the front wheels 5, 5 as a parameter to arrive at a value Tr representing a turning state of the vehicle and a roll angle detector 115 for detecting a roll angle Ar of a vehicle body (not shown) of the vehicle as a parameter to arrive at a value Cr representing a cushioning state of front and rear suspensions 12, 12 and 13, 13, and a microcomputer 116 for processing output signals of the detection system to specify the steering angle Sr of the rear wheels 11, 11 to be output as the control signal D to an actuator 8.

In the detection system, as the roll angle detector 115 there may be employed a suitable sensor making use of an implement such as a gyroscope for detecting the roll angle Ar of the vehicle body to output a corresponding electric signal.

Figure 6:
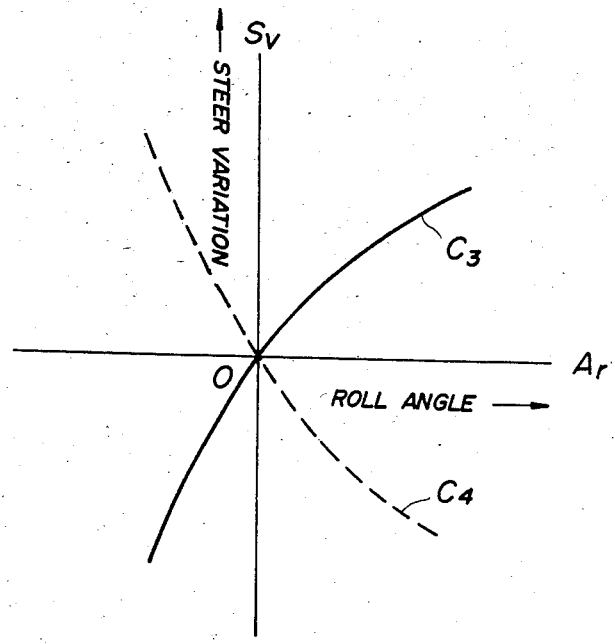
FIG. 6 is a graph of a characteristic curve showing the relation between a roll angle and a steering variation on a rear wheel of the vehicle of FIG. 5.

Referring now to FIG. 6, the vehicle body has a design reference state thereof predetermined with respect to the front and rear wheels 5, 5 and 11, 11, to which reference state the roll angle Ar is detected to be relative. When the roll angle Ar changes, on the front and rear wheels 5, 5 and 11, 11, which are suspended from the vehicle body through front and rear suspensions 12, 12 and 13, 13, respectively, there are developed corresponding steering variations as disturbances to the steering of the vehicle. As can be seen from a characteristic curve $C_3$ plotting the relation between such a steering variation Sv on the rear wheels 11, 11 and the roll angle Ar, the steering variation Sv increases as the roll angle Ar becomes larger. In this respect, it is preferable to correct the steered angle of the rear wheels 11, 11 in accordance with a curve $C_4$ having a mirror-image relation with the characteristic curve $C_3$, with respect to an axis of abscissa Sv=0 of FIG. 6, besides the steering operation of the front wheels 5, 5 by the driver.

Figure 7:
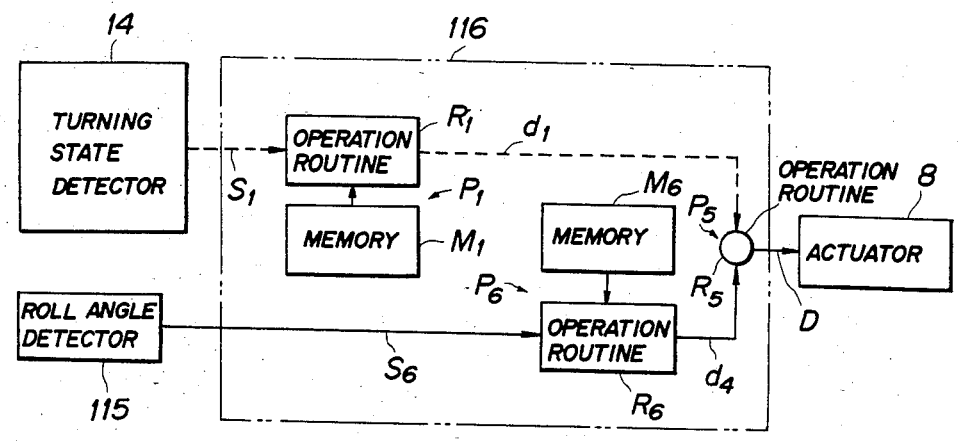
FIG. 7 is a functional block diagram of a control part of the steering system of FIG. 5.

Referring now to FIG. 7, to the computer 116 is connected the turning state detector 14 comprising a front wheel steering angle sensor (not shown), the detection result of which is passed as a detection signal $s_1$ to a first process function $P_1$ of the computer 116, where it is processed on the basis of data stored in a memory $M_1$, following an operation routine $R_1$, to obtain a data signal $d_1$ representing a common steering angle Sc of the rear wheels 11, 11 corresponding to the aforesaid detection result.

Moreover, the roll angle Ar of the vehicle body as detected by the roll angle detector 115 is passed as a detection signal $s_6$ to a second process function $P_6$ of the computer 116, where it is processed on the basis of data stored in a memory $M_6$, following an operation routine $R_6$, to obtain a data signal $d_4$ representing a correction angle Ac of the rear wheels 11, 11, by which angle Ac the steering variation Sv due to the roll angle Ar is to be reduced or cancelled.

As will be understood from the roll angle Ar versus steering variation Sv characteristic curve $C_3$, the steering variation Sv depends, in relation to the roll angle Ar, on a certain function uniquely given such as by various dimensions of a suspension linkage (not shown). Accordingly, the operation routine $R_6$ may preferably have such a function programmed therein to thereby permit the data signal $d_4$ to be easily obtained by an operation only, that is, without using the memory $M_6$.

As will be readily understood, the second process function $P_6$ has a role of providing a signal for the rear wheels 11, 11, in order to reduce or cancel the steering variation Sv according to the characteristic curve $C_3$ of FIG. 6, with a characteristic according to the curve $C_4$ contrary thereto.

Then, in a third process function $P_5$ of the computer 116, the data signal $d_4$ is subjected to an additive process with the data signal $d_1$ to specify, following an operation routine $R_5$, the rear wheel steering angle Sr, such that $Sr=Sc+Ac$ when the signal $d_1$ is given or, simply, $Sr=Ac$ when the signal $d_1$ is not given, which angle Sr is represented by the control signal D to be fed to the actuator 8. As a result, the actuator 8 steers the rear wheels 11, 11 at the angle Sr, thereby reducing or cancelling the undesirable steering variation Sv due to the rolling of the vehicle body.

In the foregoing arrangement, the turning state detector 14 and the first process function $P_1$ of the computer 116 may be eliminated to simplify the control part 101c of the steering system 101.

Figure 8:
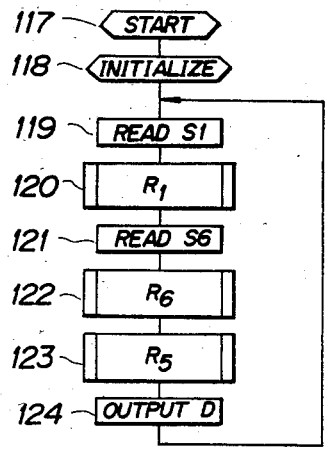
FIG. 8 is a schematic flow chart of a program for a microcomputer of the control part of FIG. 7.

Referring now to FIG. 8, there will be described below a program of the computer 116. The program is designed to start functioning when a power switch (not shown) or the like is turned on at a stage 117, and effects the initialization of peripheral devices (not shown) at a stage 118, before the program flow enters a main loop including a plurality of stages 119 to 124.

In the main loop, the detection signal $s_1$ of the turning state detector 114 is read at the first stage 119 and, at a subsequent state 120, the common steering angle Sc is obtained from the signal $s_1$, following the operation routine $R_1$. Next, at a stage 121, the detection signal $s_6$ from the roll angle detector 115 is read to determine therefrom, at a subsequent stage 122, the correction angle Ac of the rear wheels 11, 11, following the operation routine $R_6$. Then, the program flow enters a stage 123, where the steering angle Sr of the rear wheels 11, 11 is specified by way of a correction of the common steering angle Sc by the correction angle Ac, following the operation routine $R_5$. After having output the control signal D to the actuator 8 at the last stage 124 of the main loop, the flow goes to the stage 119.

As will be understood from the foregoing description, according to the second embodiment of the invention, the steered angle of the rear wheels 11, 11 is automatically controlled so as to reduce or cancel the steering variation Sv due to the roll angle Ar by the correction angle Ac determined in correspondence with the roll angle Ar. The vehicle thus has greatly improved travelling performance, particularly with respect to the turning characteristic.

It is contemplated that in the foregoing embodiments, instead of the microcomputers 16, 116, there may alternatively be employed electric circuits having process functions thereof similar to those of the computers 16, 116.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

We claim:

1. A steering system for a vehicle having a vehicle body with a front wheel and a rear wheel, and a wheel suspending mechanism for suspending said front wheel and said rear wheel from said vehicle body, respectively, comprising:
   a front wheel steering mechanism for steering said front wheel at an angle in accordance with a steering operation of a driver of said vehicle;
   a rear wheel steering mechanism for steering said rear wheel at an angle in accordance with a travelling state of said vehicle; and
   said rear wheel steering mechanism including first means for determining a steered angle correction quantity of said rear wheel in correspondence with a cushioning state of said wheel suspending mechanism, and second means for specifying said steering angle of said rear wheel in accordance with said steered angle correction quantity.

2. A steering system according to claim 1, wherein:
   said first means comprises detecting means for detecting a cushioning stroke of said wheel suspending mechanism, and processing means for determining said steered angle correction quantity in correspondence with said cushioning stroke.

3. A steering system according to claim 2, wherein:
   said processing means includes operation means for determining said steered angle correction quantity so as to cancel a steering variation uniquely given in correspondence with said cushioning stroke.

4. A steering system according to claim 3, wherein:
   said suspending mechanism comprises a front suspension for suspending said front wheel, and a rear suspension for suspending said rear wheel; and
   said detecting means is adapted to detect said cushioning stroke of at least said rear suspension.

5. A steering system according to claim 1, wherein:
   said first means comprises detecting means for detecting a roll angle of said vehicle, and processing means for determining said steered angle correction quantity in correspondence with said roll angle.

6. A steering system according to claim 5, wherein:
   said processing means includes operation means for determining said steered angle correction quantity so as to reduce a steering variation uniquely given in correspondence with said roll angle.

7. A steering system according to claim 1, wherein:
   said rear wheel steering mechanism includes third means for determining a common steering quantity of said rear wheel in accordance with a turning state of said vehicle; and
   said second means is adapted to correct said common steering quantity with said steered angle correction quantity, to thereby specify said steering angle of said rear wheel.

8. A steering system for a vehicle having a vehicle body with front wheels and rear wheels, and a wheel suspending mechanism for suspending said front wheels and said rear wheels from said vehicle body, respectively, comprising:
   a front wheel steering mechanism for steering said front wheels at an angle in accordance with a steering operation of a driver of said vehicle;
   a rear wheel steering mechanism for steering said rear wheels at an angle in accordance with a traveling state of said vehicle; and
   said rear wheel steering mechanism including first means for determining a steered angle correction quantity of said rear wheels in correspondence with a cushioning state of said wheel suspending mechanism, and second means for specifying said steering angle of said rear wheels in accordance with said steered angle correction quantity.

9. A steering system for a vehicle having a vehicle body with front wheels and rear wheels, and a wheel suspending mechanism for suspending said front wheels and said rear wheels from said vehicle body, respectively, comprising:
   a front wheel steering mechanism for steering said front wheels at an angle in accordance with a steering operation of a driver of said vehicle;
   a rear wheel steering mechanism for steering said rear wheels at an angle in accordance with a traveling state of said vehicle;
   said rear wheel steering mechanism including first means for determining a steered angle correction quantity of said rear wheels in correspondence with a cushioning state of said wheel suspending mechanism, and second means for specifying said steering angle of said rear wheels in accordance with said steered angle correction quantity; and
   said first means comprises detecting means for detecting a cushioning stroke of said wheel suspending mechanism, and processing means for determining said steered angle correction quantity in correspondence with said cushioning stroke.

10. A steering system for a vehicle having a vehicle body with front wheels and rear wheels, and a wheel suspending mechanism for suspending said front wheels and said rear wheels from said vehicle body, respectively, comprising:
    a front wheel steering mechanism for steering said front wheels at an angle in accordance with a steering operation of a driver of said vehicle;
    a rear wheel steering mechanism for steering said rear wheels at an angle in accordance with a traveling state of said vehicle;
    said rear wheel steering mechanism including first means for determining a steered angle correction quantity of said rear wheels in correspondence with a cushioning state of said wheel suspending mechanism, and second means for specifying said steering angle of said rear wheels in accordance with said steered angle correction quantity; and
    said first means comprises detecting means for detecting a roll angle of said vehicle, and processing means for determining said steered angle correction quantity in correspondence with said roll angle.

* * * * *